United States Patent [19]

Smart et al.

[11] Patent Number: 5,550,608
[45] Date of Patent: Aug. 27, 1996

[54] APPARATUS AND METHOD FOR CLOSING A FILM CASSETTE AND UNLOADING THE CLOSED CASSETTE FROM A CAMERA

[75] Inventors: David C. Smart, Rochester; Thomas E. Dussinger, Henrietta, both of N.Y.

[73] Assignee: Eastman Kodak Company, Rochester, N.Y.

[21] Appl. No.: 371,336

[22] Filed: Jan. 11, 1995

[51] Int. Cl.⁶ .................................................. G03B 19/10
[52] U.S. Cl. .......................................... 354/174; 354/275
[58] Field of Search ...................................... 354/174, 275

[56]  References Cited

U.S. PATENT DOCUMENTS

| | | | |
|---|---|---|---|
| 2,357,076 | 8/1944 | Briskin et al. | 352/74 |
| 4,095,249 | 6/1978 | Miura | 352/74 |
| 4,954,857 | 9/1990 | Mochida et al. | |
| 5,311,231 | 5/1994 | Suzuki et al. | |
| 5,357,303 | 10/1994 | Wirt | 354/275 |
| 5,359,378 | 10/1994 | Zander et al. | |
| 5,452,036 | 9/1995 | Kamata | |

*Primary Examiner*—Monroe H. Hayer
*Attorney, Agent, or Firm*—Roger A. Fields

[57]  ABSTRACT

A camera comprising a cassette-receiving chamber for holding a film cassette provided with a light lock which is pivoted closed before removing the cassette from the chamber, is characterized in that an exterior opening to the chamber is positioned to longitudinally admit an implement into the chamber for rotation to pivot the light lock closed and to further admit the implement into the chamber to push the cassette out of the chamber.

14 Claims, 5 Drawing Sheets

APPARATUS AND METHOD FOR CLOSING A FILM CASSETTE AND UNLOADING THE CLOSED CASSETTE FROM A CAMERA

CROSS-REFERENCE TO RELATED APPLICATION(S)

Reference is made to commonly assigned copending applications Ser. No. 08/407,991, entitled CAMERA WITH BUILT-IN MEANS FOR CLOSING FILM CASSETTE AND EJECTING CLOSED CASSETTE and filed in the name of Edward N. Balling, Ser. No. 08/407,835, entitled CAMERA WITH BUILT-IN MEANS FOR CLOSING FILM CASSETTE AND TEARING OPEN CAMERA TO REMOVE CLOSED CASSETTE and filed in the name of Edward N. Balling, and Ser. No. 08/407,992, entitled CAMERA WITH FILM SENSOR FOR CLOSING CASSETTE WHEN FILMSTRIP WOUND COMPLETELY INTO CASSETTE and filed in the name of Edward N. Balling.

FIELD OF THE INVENTION

The invention relates generally to the field of photography, and in particular to an apparatus and a method for closing a film cassette and unloading the closed cassette from a camera.

BACKGROUND OF THE INVENTION

Commonly assigned prior art U.S. Pat. No. 5,357,303, issued Oct. 18, 1994, discloses a film cassette having a light lock which is pivoted closed to prevent ambient light from entering the cassette interior and is pivoted open to permit film movement out of and into the cassette interior. An implement or tool is designed to engage the light lock to pivot it open and closed.

Commonly assigned prior art U.S. Pat. No. 5,231,438, issued Jul. 27, 1993, discloses a camera intended for use with a film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

SUMMARY OF THE INVENTION

According to a first aspect of the invention, a camera comprising a cassette-receiving chamber for holding a film cassette provided with a light lock which is pivoted closed before removing the cassette from the chamber, is characterized in that:

the camera has an exterior opening to the chamber positioned to longitudinally admit an implement into the chamber for rotation to pivot the light lock closed and to further admit the implement into the chamber to push the cassette out of the chamber.

According to a second aspect of the invention, a method of closing a pivotal light lock of a film cassette in a cassette-receiving chamber of a camera, and removing the cassette from the chamber, comprises:

inserting an implement part way into the chamber;

rotating the implement to pivot the light lock closed; and inserting the implement further into the chamber to push the cassette out of the chamber.

According to a third aspect of the invention, an implement intended for use with a camera which has a cassette-receiving chamber for holding a film cassette provided with a light lock to be pivoted closed before removing the cassette from the chamber, is characterized in that:

the implement has means for engaging the light lock and is configured to be inserted part way through an exterior opening of the camera and into the chamber to engage the light lock, to be rotated to pivot the light lock closed, and to be inserted further through the exterior opening and into the chamber to push the cassette out of the chamber.

DETAILED DESCRIPTION OF THE INVENTION

Figure 1:
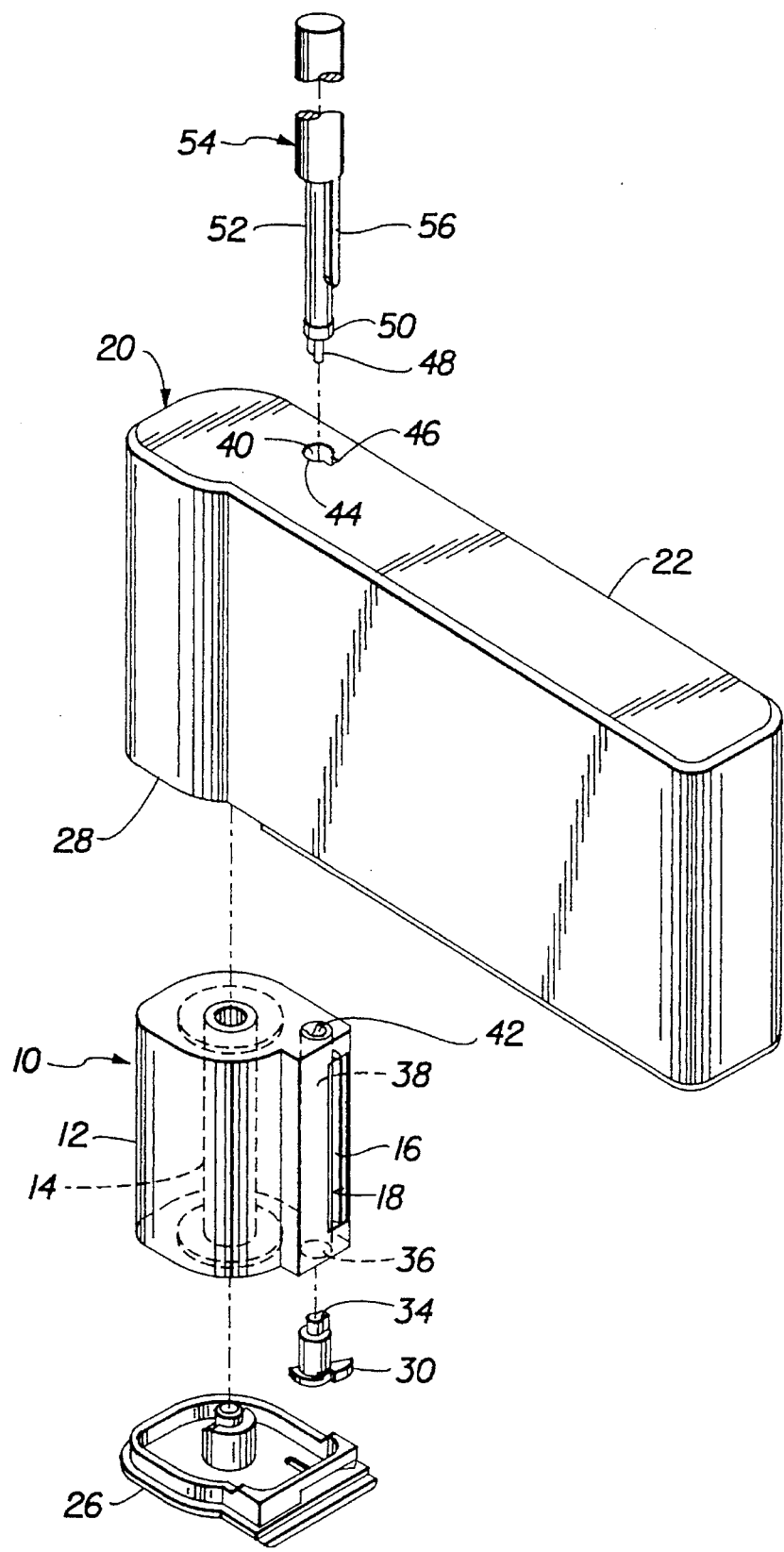
FIG. 1 is an exploded perspective view of a preferred embodiment of the invention.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 comprises a cassette shell 12 housing a flanged spool 14 on which is stored a wound filmstrip (not shown). A light lock 16 which is pivoted open to uncover a film egress/ingress slot 18 in the cassette shell 12 and is pivoted closed to prevent ambient light from entering the shell interior through the slot.

Figure 2:
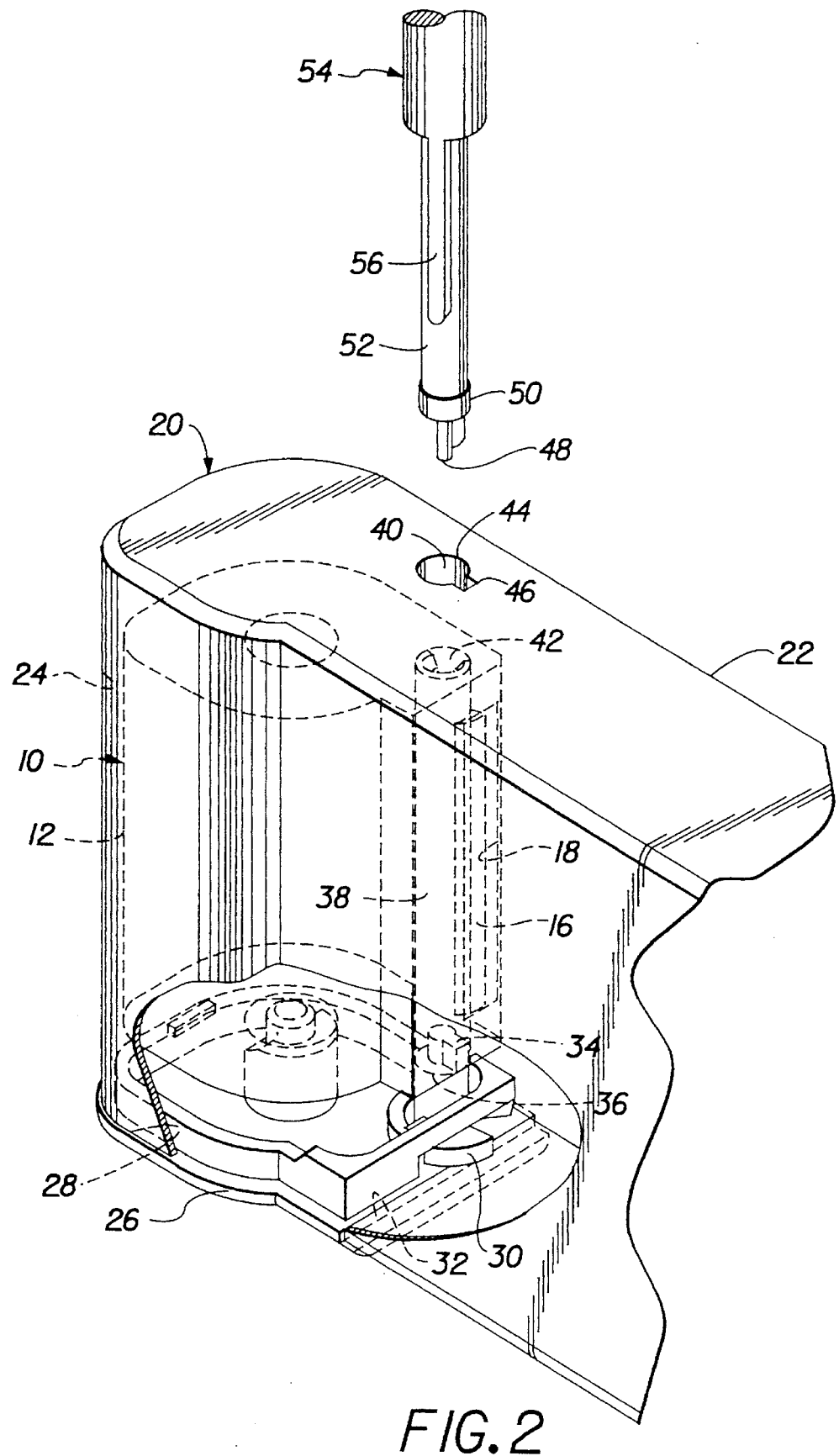
FIGS. 2–5 are perspective views of the preferred embodiment, depicting its operation.
Figure 3:
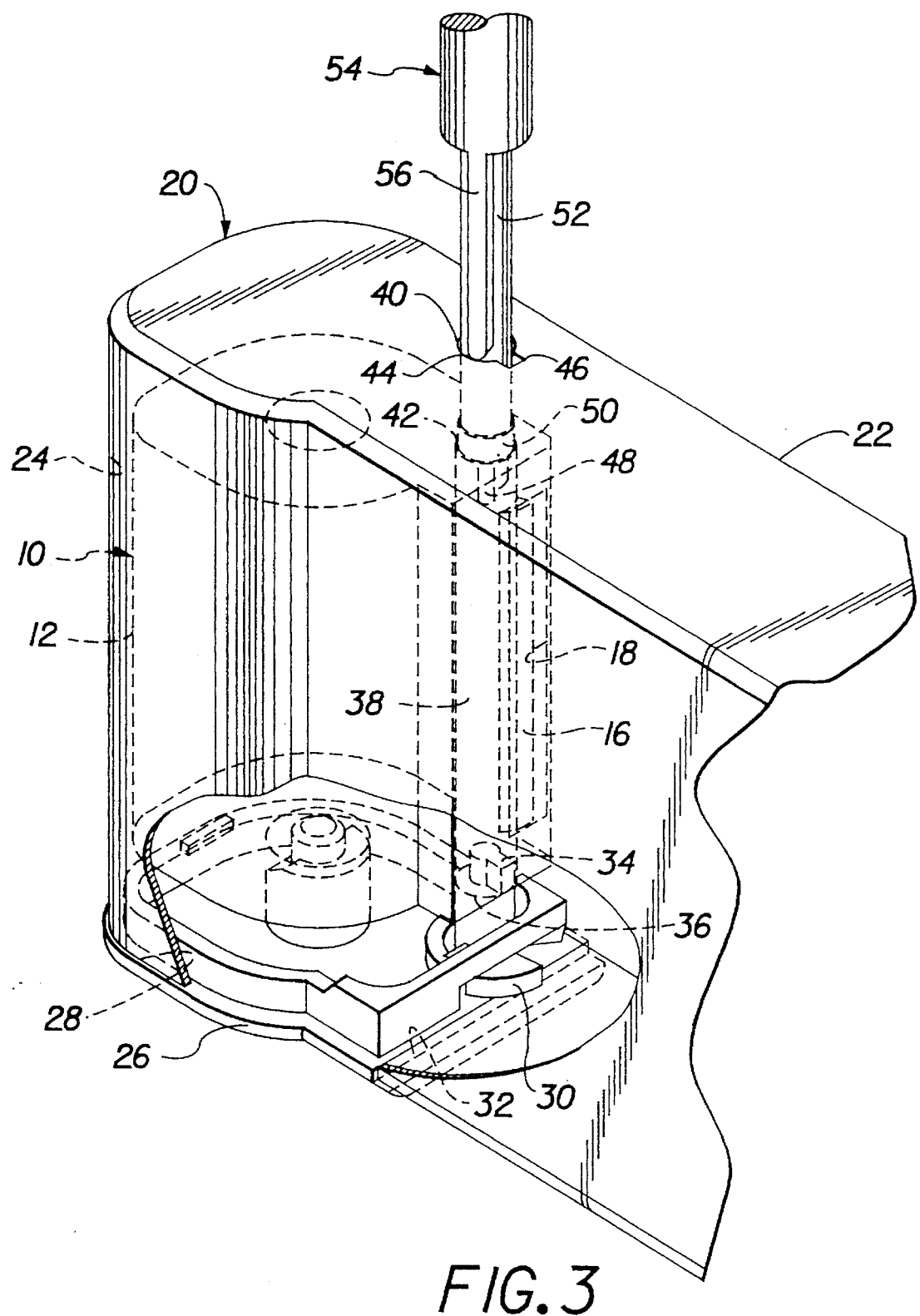
Figure 4:
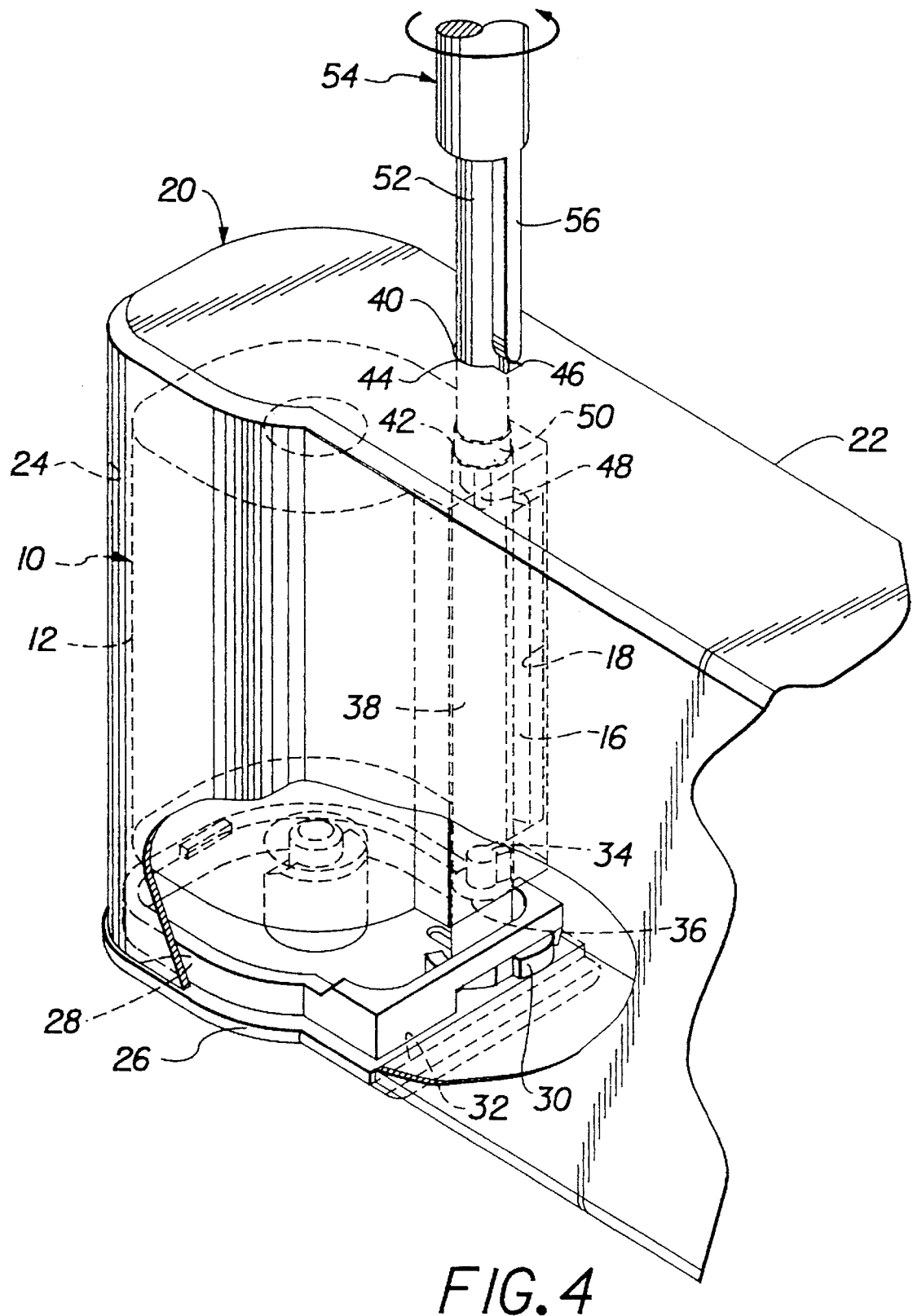
Figure 5:
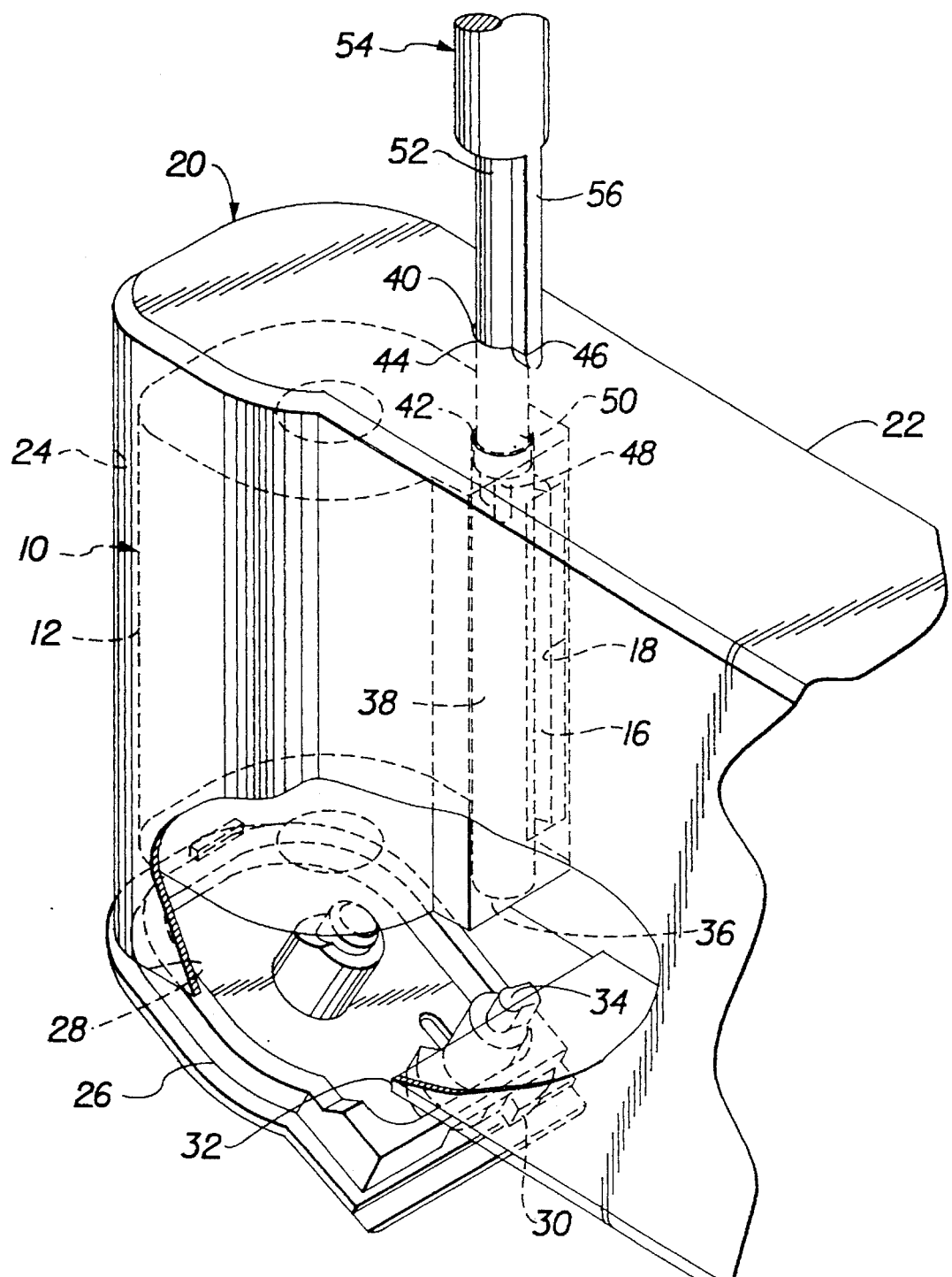

A camera 20 with which the film cassette 10 is intended to be used comprises a body 22, including an internal cassette-receiving chamber 24 for holding the film cassette, and a lid or door 26. The lid 26 is pivotally connected to the body 22 to uncover and cover a cassette ingress/egress opening 28 to the chamber 24, to open and close the chamber. A latch 30 pivotally mounted on the inside of the lid 26 is pivoted to overlap an edge 32 of the body 22 at the cassette ingress/egress opening 28 to secure the lid closing the chamber 24, as shown in FIGS. 2 and 3, and is pivoted away from the edge to permit the lid to be pivoted to open the chamber, as shown in FIGS. 4 and 5. The latch 30 includes an upstanding key-piece 34 that engages one exposed end 36 of an axial shaft 38 of the light lock 16 when the lid 26 covers the cassette ingress/egress opening 28. Consequently, when the light lock 16 is pivoted open, the latch 30 is pivoted to overlap the edge 32 of the body 22, and when the light lock is pivoted closed, the latch is pivoted away from the edge.

An exterior opening 40 in the body 22 opens to the chamber 24 at a location facing an opposite exposed end 42 of the axial shaft 38 of the light lock 16. As shown in FIG. 2, the exterior opening 40 has a circular portion 44 and a radial slot portion 46. To pivot the light lock 16 closed, only a leading key-piece 48 and a forward-most section 50 of a cylindrical part 52 of an implement or tool 54 are longitudinally inserted through the circular portion 44 of the exterior opening 40 and into the chamber 24. A second key-piece 56 radially projecting from the cylindrical part 52 of the implement 54 is not inserted into the exterior opening 40, but instead extends radially beyond the circular portion 44 of the exterior opening as shown in FIG. 3. The leading key-piece 48 of the implement 54 is positioned in engagement with the exposed end 42 of the axial shaft 38 of the light lock 16. When the implement 54 is then rotated in a counter-clockwise direction as shown in FIG. 4, the light lock 16 is pivoted closed. At the same time the latch 30 (via the upstanding key-piece 34 in engagement with the exposed end 36 of the axial shaft 38 of the light lock 16) is pivoted away from the edge 32 of the body 22.

As shown in FIG. 4, rotation of the implement 54 to pivot the light lock 16 closed, aligns the second key-piece 56 of the implement with the radial slot portion 46 of the exterior opening 40, which then permits the implement to be longitudinally inserted further through the exterior opening and into the chamber 24. Further inserting the implement 54 through the exterior opening 40 and into the chamber 24 pushes the film cassette 10 against the lid 26 to pivot the lid to uncover the cassette ingress/egress opening 28, to permit the film cassette to be pushed out of the chamber 24 as shown in FIG. 5. Since the second key-piece 56 is received in the radial slot portion 46, the implement 54 is prevented from being rotated. Thus, the light lock 16 cannot be pivoted open.

The invention has been described with reference to a preferred embodiment. However, it will be appreciated that variations and modifications can be effected by a person of ordinary skill in the art without departing from the scope of the invention. For example, instead of the implement 54 being positioned in contact with the film cassette 10 in order for the implement to pivot the light lock 16 closed and push the cassette out of the chamber 24, an intermediate device could be included in the camera 20 between the film cassette and the implement to allow the implement to achieve the same result. Thus, the implement would contact the intermediate device rather than the film cassette.

PARTS LIST 10. film cassette
12. cassette shell
14. flanged spool
16. light lock
18. film egress/ingress slot
20. camera
22. body
24. cassette-receiving chamber
26. lid
28. cassette ingress/egress opening
30. latch
32. edge
34. upstanding key-piece
36. exposed end
38. axial shaft
40. exterior opening
42. exposed end
44. circular portion
46. radial slot portion
48. leading key-piece
50. forward-most section
52. cylindrical part
54. implement
56. second key-piece

We claim:

1. A camera comprising a cassette-receiving chamber for holding a film cassette provided with a light lock which is pivoted closed before removing the cassette from said chamber, is characterized in that:

said camera has an ingress opening to one end of said chamber positioned to longitudinally admit a separate implement, not part of the camera, into the chamber for rotation to pivot the light lock closed and to further admit the implement into the chamber to push the cassette out of the chamber through an egress opening at an opposite end of the chamber.

2. A camera as recited in claim 1, wherein said ingress opening has an internal edge configured for preventing the implement from being rotated to pivot the light lock open as the implement is further admitted into said chamber to push the cassette out of the chamber.

3. A camera as recited in claim 1, wherein a lid which closes said chamber at said egress opening is supported for the cassette to be pushed against said lid to move the lid to open the chamber when the cassette is pushed out of the chamber.

4. A camera as recited in claim 3, wherein a latch secures said lid closing said chamber and is engageable with the light lock for movement to release the lid when the light lock is pivoted closed.

5. A camera comprising a cassette-receiving chamber for holding a film cassette, is characterized in that:

said camera has an exterior opening to said chamber positioned to longitudinally admit a separate implement, not part of the camera, into the chamber to push the cassette out of the chamber; and a lid which closes said chamber is supported for the cassette to be pushed against said lid to move the lid to open the chamber when the cassette is pushed out of the chamber.

6. A camera comprising a cassette-receiving chamber for holding a film cassette provided with a light lock which is pivoted closed before removing the cassette from said chamber, is characterized in that:

said camera has an exterior opening to said chamber which is positioned to longitudinally admit an implement into the chamber for rotation to pivot the light lock closed and to further admit the implement into the chamber to push the cassette out of the chamber and which includes an internal edge configured for preventing the implement from being rotated to pivot the light lock open as the implement is further admitted into said chamber to push the cassette out of the chamber.

7. A method of closing a pivotal light lock of a film cassette in a cassette-receiving chamber of a camera, and removing the cassette from the chamber, comprising:

inserting a separate implement, not part of the camera, part way into the chamber through an ingress opening to end of the chamber;

rotating the implement to pivot the light lock closed; and inserting the implement further into the chamber to push the cassette out of the chamber through an egress opening at an opposite end of the chamber.

8. A method as recited in claim 7, wherein the implement is prevented from being rotated to pivot the light lock open as it is inserted further into the chamber to push the cassette out of the chamber.

9. A method as recited in claim 7, wherein the implement is inserted further into the chamber to push the cassette against a lid closing the chamber at said egress opening to push the lid to open the chamber.

10. A method as recited in claim 9, wherein the implement is rotated to pivot a latch which secures the lid closing the chamber to release the lid to permit the cassette to push the lid to open the chamber.

11. A camera comprising a cassette-receiving chamber for holding a film cassette provided with a light lock which is pivoted closed before removing the cassette from said chamber, is characterized in that:

said camera has an exterior opening to said chamber positioned to longitudinally admit an implement into the chamber for rotation to pivot the light lock closed and to further admit the implement into the chamber to push the cassette out of the chamber;

a lid which closes said chamber is supported for the cassette to push said lid to open the chamber when the cassette is pushed out of the chamber; and a latch secures said lid closing said chamber and is engageable with the light lock for movement to release the lid when the light lock is pivoted closed.

12. A method of closing a pivotal light lock of a film cassette in a cassette-receiving chamber camera, and removing the cassette from the chamber, comprising:

inserting an implement part way into chamber;

rotating the implement to pivot the light lock closed and to pivot a latch which secures a lid closing the chamber to release the lid; and inserting the implement further into the chamber to push the cassette against the lid to push the lid to open the chamber and to push the cassette out of the chamber.

13. A camera comprising a cassette-receiving chamber for holding a film cassette provided with a light lock which is pivoted closed before removing the cassette from said chamber, is characterized in that:

said camera has an ingress opening to one end of said chamber positioned to longitudinally admit a separate implement, not part of the camera, into the chamber for rotation to pivot the light lock closed and to further admit the implement into the chamber to push the cassette out of the chamber through an egress opening at an opposite end of the chamber; and means is located with respect to said ingress opening for preventing the implement from being further admitted into said chamber to push the cassette out of the chamber until after the implement is rotated to pivot the light lock closed.

14. A camera comprising a cassette-receiving chamber for holding a film cassette provided with a light lock which is pivoted closed before removing the cassette from said chamber, is characterized in that:

said camera has an ingress opening to one end of said chamber positioned to longitudinally admit a separate implement, not part of the camera, into the chamber to push the cassette out of the chamber through an egress opening at an opposite end of the chamber; and means prevents the implement from being admitted into said chamber to push the cassette out of the chamber until the light lock is pivoted closed.

* * * * *

UNITED STATES PATENT AND TRADEMARK OFFICE
CERTIFICATE OF CORRECTION

PATENT NO.   : 5,550,608
DATED        : August 27, 1996
INVENTOR(S)  : David C. Smart, et al It is certified that error appears in the above-indentified patent and that said Letters Patent is hereby corrected as shown below:

Column 5, line 29,    After "chamber" insert --of a --.

Signed and Sealed this

Twenty-fifth Day of November, 1997

Attest:

BRUCE LEHMAN

*Attesting Officer*            Commissioner of Patents and Trademarks